United States Patent Office 3,709,731
Patented Jan. 9, 1973

3,709,731
PRODUCTION OF CRYSTALLINE DEXTROSE
MONOHYDRATE
Wouter G. Kingma, Huizen, Netherlands, assignor to
Continental Engineering, Ingenieursbureau voor de
Procesindustrie N.V., Amsterdam, Netherlands
Filed June 1, 1970, Ser. No. 42,031
Claims priority, application Netherlands, June 5, 1969,
6908590
Int. Cl. B01d 9/02; C13f 1/00, 1/02
U.S. Cl. 127—58
8 Claims

ABSTRACT OF THE DISCLOSURE

A process for the production of crystalline dextrose monohydrate, wherein a dextrose mass which initially comprises mainly a concentrated dextrose solution is continuously passed in prop flow through an elongated horizontal crystallization zone to effect crystal formation and then through an ageing zone to effect crystal growth, whereupon the dextrose mass is separated into crystals and mother liquor and the mother liquor is concentrated and subjected again to crystallization and ageing. A vacuum is created above the dextrose mass flowing through the crystallization zone so as to cause a temperature fall therein by self-evaporation and to effect crystal formation. At the same time, the mass in the crystallization zone is stirred in planes perpendicular to its direction of flow and substantially no heat is supplied from the outside. Crystal growth within the ageing zone is effected at constant temperature and atmospheric pressure. The concentrated mother liquor may be worked up by blending part of it with initial dextrose solution and recycling it to the beginning of the process or by subjecting at least part of it to a second cycle of operations comprising passing the concentrated mother liquor through a second crystallization zone and a second ageing zone and separating the resulting mass into a second portion of crystals and a second mother liquor. The second portion of crystals may be combined with crystals resulting from the first cycle of operations or recovered separately or blended with an initial dextrose solution and recycled to the beginning of the process.

---

This invention relates to the production of crystalline dextrose monohydrate by a new and convenient process.

Crystalline dextrose monohydrate is normally produced by crystallization of a dextrose solution contained in a cooling trough provided with cooling elements. However, the solution must remain in that cooling trough for a period of 40 to 70 hours before a sufficient amount of crystals has been formed and further, a predetermined temperature program must be followed quite accurately. Moreover, if such a crystallization is followed by a second crystallization step in another cooling trough, the period of crystallization in that trough is still considerably longer, e.g. 1.5 to 2 times as long as in the first trough. Such a long crystallization period is caused by nucleations formed in a viscous barrier film adjacent the cooling walls of the trough when the solution is cooled too fast. Moreover, incrustations are formed at the cooling walls and these incrustations have a detrimental effect on any heat transfer from dextrose solution to cooling medium. The crystals as formed are small and cannot be separated easily from their mother liquor in a conventional way, e.g. by centrifuging. Further, part of the crystals dissolve in washing liquid when washed in a centrifuge.

The invention has for an object to prevent the aforesaid disadvantages during crystallization of dextrose monohydrate from aqueous solutions or masses.

Another object is to provide a process for the production of crystalline dextrose monohydrate wherein the crystallization period, i.e. the residence time of the solution or mass to be crystallized in a crystallization system is considerably reduced.

A further object is to provide a process for the production of crystalline dextrose monohydrate wherein substantially no nucleations or incrustations are formed.

Still another object is to produce dextrose monohydrate crystals that are coarser than crystals of the prior art and may be separated more easily and washed without dissolving.

These and other objects are obtained in accordance with the process of the present invention, wherein a dextrose mass which initially comprises mainly a concentrated dextrose solution is continuously passed in prop flow through an elongated, horizontal crystallization zone. The dextrose mass may initially be a pure concentrated dextrose solution obtained from the conversion of starch, or a blend from such a solution with a concentrated mother liquor obtained in a later stage of the process or a blend of one of them with dextrose monohydrate crystals resulting from another stage of the process. This dextrose mass, having an initial temperature above the temperature of crystallization is passed in prop flow through said elongated, horizontal crystallization zone and a vacuum is created above its surface in order to cause self-evaporation of the mass. Thanks to this self-evaporation, the flowing mass is efficiently thickened and moreover cooled to a temperature permitting crystal formation so that crystals of dextrose monohydrate will be formed at least at the evaporation surface of the flowing mass. Meanwhile, the flowing mass is stirred in planes substantially perpendicular to the axis of the crystallization zone so that any material at the evaporation surface of the flowing mass is continuously refreshed by other material. Thanks to this stirring action, there is created a uniform temperature and a uniform super-saturation in any cross-sectional area of the mass flowing within the crystallization zone. In this way, the crystals formed are permitted to grow uniformly although a high supersaturation is maintained. Care is taken that heat supply from the outside is substantially absent in order to prevent the flowing mass from boiling throughout its whole volume and to prevent nucleation forming. Vapor bubbles are thus only formed at the evaporation surface of the flowing mass and crystal growth is easily controlled. Further, the mass is passed in prop flow through the crystallization zone which has for a result that it proceeds steadily through that zone without risk of uncontrolled mixing of different portions; only near the entrance of the crystallization zone, a certain mixing phonomenon will occur but it is restricted to a fresh entering portion and an immediately preceding portion which causes no harm. As a result, the formation and growth of dextrose monohydrate crystals within the crystallization zone is permitted to occur in a controlled manner, this crystal formation and crystal growth resulting in a crystal-bearing mass which has still a strong supersaturation.

After leaving the crystallization zone, the dextrose mass is continuously passed in prop flow through an elongated, horizontal ageing zone, where any remaining supersaturation of the mass is removed by effecting further growth of crystals at substantially constant temperature and atmospheric pressure. Crystal growth will be undisturbed and thus, this part of the crystallization process is again well controlled. The mass leaving the ageing zone is separated into crystals and mother liquor, e.g. by centrifuging, whereupon the crystals are recovered, the mother liquor is concentrated by evaporation, and all aforementioned steps are repeated at least one time with this concentrated mother liquor instead of the initial dextrose mass in order to obtain an improved yield of crystals. As a result, the total period of crystallization (residence time in crystallization zone and ageing zone) is reduced to about 25 hours. Moreover, the resulting crystals are coarser than by utilization of cooling elements and they may be separated more easily from mother liquor and washed without dissolving. The yield of crystals will be high, thanks to working up the mother liquor and a special advantage is that no inoculation is necessary to provoke crystallization.

The appropriate temperature for crystal formation and crystal growth of dextrose monohydrate is in general a function of the concentration and temperature of the starting mass and will be between 34° and 28° C. at an initial concentration of 70–72% and an initial temperature of 45° C. It is preferred, therefore, to create a vacuum within the crystallization zone of sufficient height to reach a temperature between 34 and 28° C. when the initial concentration and temperature are as just specified.

In most cases, the crystallization zone is an entity and a vacuum of predetermined height is created above the surface of the mass flowing therein. In a special embodiment, however, the crystallization zone comprises two or more parts situated one behind the other in longitudinal direction of the crystallization zone. Vacuums of different height are created and maintained then in these parts, i.e. the vacuum in a part later to be passed by the flowing mass is of greater height than the vacuum in a preceding part. When the crystallization zone has two parts, it is preferred to create in the first part a vacuum of sufficient height to reach an intermediate temperature of the mass between 40 and 34° C., when the initial concentration was 70–72% and the initial temperature was 45° C., and in the second part to create a vacuum of sufficient height to reach a temperature between 34° and 28° C., starting with the intermediate temperature.

In the ageing zone, a relatively high amount of heat is produced during crystal growth therein (about 25 kilocalories per kilogram of dextrose monohydrate crystals). Therefore, it is preferred to absorb heat from the ageing zone in order to maintain the temperature of the mass substantially constant.

After leaving the ageing zone, the mass is separated into crystals and mother liquor, the mother liquor is concentrated and the aforesaid operations are repeated one or more times with the concentrated mother liquor. This may be effected in several ways.

Thus, at least a portion of the concentrated mother liquor may be recycled to the beginning of the process and blended with a fresh dextrose solution. It is subjected then together with this fresh dextrose solution to the aforesaid steps crystallization, ageing and separation.

In another way, the concentrated mother liquor or at least a non-recycled part thereof, is passed continuously and in prop flow through a second crystallization zone and a second ageing zone, wherein similar conditions prevail as in the aforesaid first crystallization and first ageing zone, respectively. The resulting crystal-bearing mass is separated into a second portion of crystals and a second mother liquor. The process is a double process then, and the conditions for working up the mother liquor may be adjusted to some extent independently from the conditions used for fresh dextrose mass and in any case be well controlled. The second portion of crystals obtained in this way may be withdrawn separately, or may be added to the first portion of crystals (resulting from separation after passing the first ageing zone), or may be blended with a concentrated dextrose solution and recycled to the first crystallization zone. A selection to be made here will depend on several factors like yield, purity and size of crystals and the like.

The invention will be illustrated now by means of the accompanying drawings which are given by way of example only.

FIG. 3 is a view of a vacuum crystallizer to be used in the system of FIG. 1 or FIG. 2, in a modified form.

Figure 1:
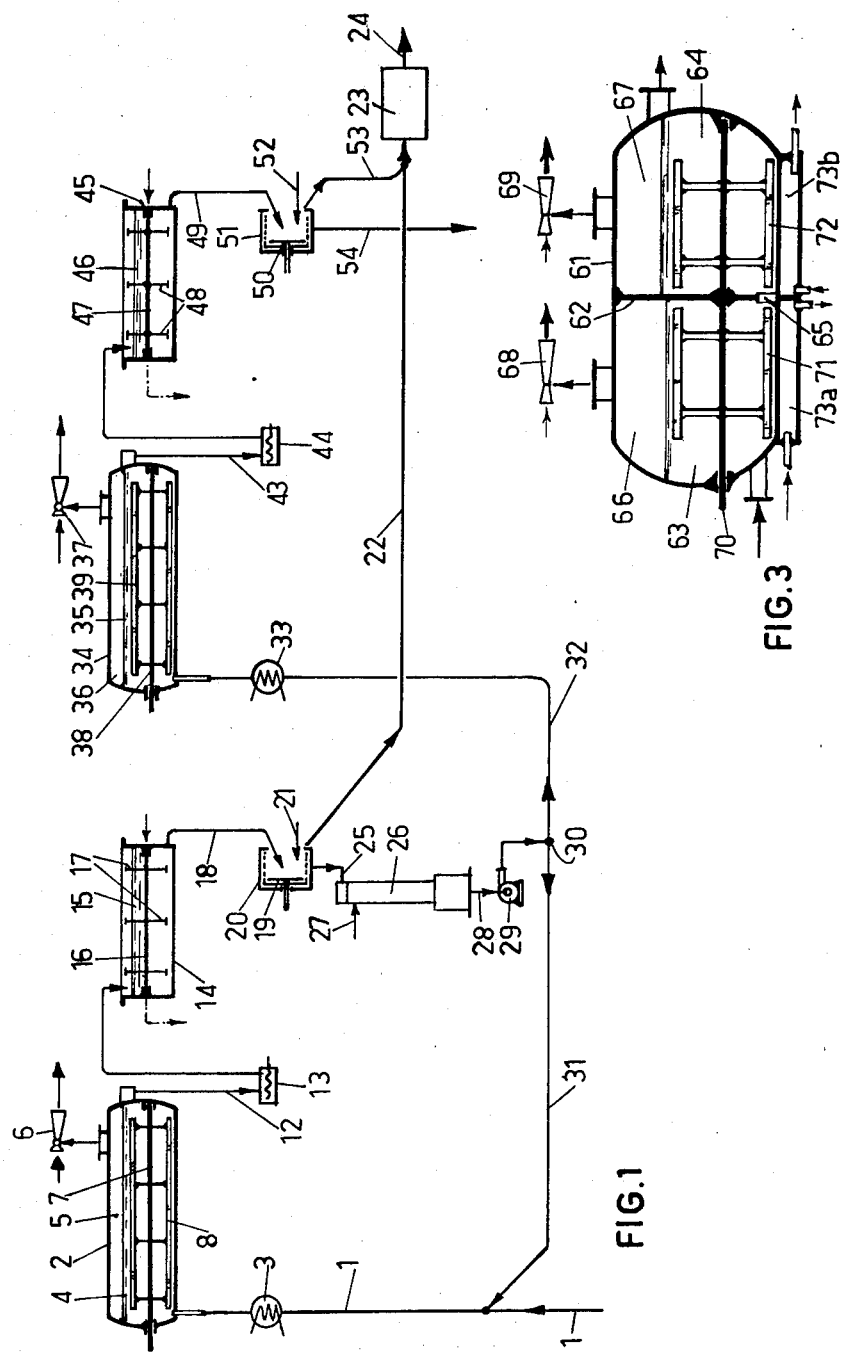
FIG. 1 is a schematic illustration of a first embodiment of a system for effecting the invented process.

In the system of FIG. 1, a hot concentrated dextrose solution is introduced continuously through conduit 1 and passed through a cooler 3 to a vacuum crystallizer 2. This crystallizer 2 is positioned horizontally and thus defines an elongated, horizontal crystallization zone 4, which is passed in longitudinal direction by the flowing dextrose mass. The mass is flowing continuously and in prop flow through the crystallization zone which means that any portion of the dextrose mass that enters the crystallization zone will always cause another portion of equal volume to leave that zone.

During operation, about 70 to 75% of the capacity of the crystallizer is occupied by flowing dextrose mass. A vapor space 5 is left above the surface of the flowing mass and is connected to a vacuum source 6.

The purpose of vacuum source 6 is to create within crystallizer 2 a vacuum of sufficient height to cause self-evaporation of the flowing mass therein at its free surface. Such self-evaporation will cause a temperature fall within the flowing mass which has already been cooled slightly in cooler 3, and the vacuum created in vapor space 5 should also be of sufficient height to cause the temperature to drop to an appropriate value for crystal growth of dextrose monohydrate, e.g. a temperature between 34 and 28° C. Not only will an amount of live heat be withdrawn from the flowing mass by this vacuum and self-evaporation but also a relatively high amount of crystallization heat of dextrose monohydrate (25 kilocalories per kilogram of monohydrate) and the result will be that crystals of dextrose monohydrate are formed within the flowing mass at its evaporation surface.

One or two rotors 7 are provided within crystallizer 2 in order to ensure good blending of the crystals formed with the remainder of the flowing mass and to bring constantly, in doing so, deeper lying portions of the flowing mass to its evaporation surface. These rotors 7 may have flat axial blades 8 at their circumference so as to ensure that any stirring action is effected in planes perpendicular to their axes and will cause no propulsion of the flowing mass in axial direction. A certain supersaturation will be formed within the flowing mass as a result of its self-evaporation, and thanks to the stirring action of the rotors, this supersaturation will become uniform throughout any cross-sectional area of the crystallization zone, thus allowing the crystals to grow without any nucleation being formed.

Continuously leaving crystallizer 2 is a crystal-bearing but still supersaturated dextrose mass. This mass is passed continuously through a conduit 12 and a pump 13 to a trough 14 where further crystallization is permitted to take place and where the supersaturation of the mass is reduced to a minimum. In a way similar to that of vacuum crystallizer 2, trough 14 defines an elongated, horizontal ageing zone 15 which is passed continuously and in longitudinal direction by the flowing mass. Here too, the mass is flowing in prop flow which means that any portion of the dextrose mass that enters the ageing zone will always cause another portion of equal volume to leave that zone.

Atmospheric pressure is present above the surface of the flowing mass within trough 14. A driven stirring shaft 16 having blades 17 causes a stirring action of the mass but only in planes perpendicular to the axis of the shaft and without axial propulsion. In this way, the mass is carefully but effectively stirred and the supersaturation within the flowing mass, as far as still existing, will remain substantially uniform throughout any cross-sectional area of the ageing zone. The crystals have an opportunity to grow further then without any nucleation being formed and the supersaturation of the flowing mass will gradually decrease in its direction of flow. Cooling water is passed in a direction indicated by arrows through stirring shaft 16 and, if desired, through blades 17 so as to withdraw crystallization heat from the growing crystals and to keep the temperature at a substantially constant level.

Continuously leaving ageing trough 14 is a dextrose mass of high crystal contents. This mass is passed through conduit 18 to centrifuge 20 which has a movable bottom 19, and is separated therein into solid crystals and a mother liquor. The separated crystals are washed with water from conduit 21 and are passed through conduit or conveyor 22 to a drier 23. They are withdrawn from the system as a product at 24.

The mother liquor drained from centrifuge 20 is passed through conduit 25 to evaporator 26 where it is concentrated by means of evaporation. Heating steam for effecting this evaporation is introduced at 27.

Leaving evaporator 26 is a concentrated mother liquor comprising a relatively high concentration of undissolved substances. This concentrated mother liquor enters a conduit 28 provided with a pump 29. Conduit 28 is branched at 30 and a portion of the concentrated liquor will thus be recycled through conduit 31 to supply conduit 1 where it is blended with fresh dextrose solution and then passed to cooler 3 and to vacuum crystallizer 2 for being subjected to a new crystallization cycle.

Another portion of concentrated mother liquor from conduit 28 is passed through conduit 32 and cooler 33 to a second vacuum crystallizer 34 mainly corresponding in construction to crystallizer 2. Crystallizer 34 defines an elongated, horizontal crystallization zone 35 which is passed in longitudinal direction by the flowing mass of concentrated mother liquor. The mass is flowing continuously and in prop flow. During operation, about 70–75% of the crystallizer capacity is occupied by flowing mass and a vapor space 36 is left above the surface of the flowing mass.

Vapor space 36 is connected to a vacuum source 37, which creates a vacuum in crystallizer 34. This vacuum is of sufficient height to cause self-evaporation and thus to cause a temperature fall within the flowing mass (which has already been cooled in cooler 33) to an appropriate temperature for crystal growth of dextrose monohydrate.

Usually, the temperature to be reached in crystallizer 34 is somewhat lower and the vacuum created therein is somewhat higher than in crystallizer 2. One or two driven rotors 38 having axial blades 39 may be present for the purpose of good mixing; they will mainly provide a stirring action in planes perpendicular to their axes and will give no axial propulsion.

A crystal-bearing and still supersaturated mass is continuously leaving crystallizer 34 and is passed continuously through a conduit 43 and pump 44 to ageing trough 34. This trough 34 corresponds in construction to trough 14 and also defines an elongated, horizontal ageing zone 46, which is passed continuously in longitudinal direction and in prop flow by the flowing mass. Driven stirring means 47 having blades 48 provide for a stirring action which is in planes perpendicular to the longitudinal direction of the trough and will give no axial propulsion. Cooling water is passed through the stirring shaft and will provide for a substantially constant temperature so that the crystals are permitted to grow without any nucleation being formed.

A dextrose mass of high crystal content is leaving through 45 continuously and is passed through conduit 49 to centrifuge 51 which has a moveable bottom 50. In this centrifuge the mass is separated into crystals and mother liquor. The crystals are washed with water from conduit 52 and are passed through a conduit or conveyor 53 to the aforesaid drier 23. They are withdrawn from the system as a product at 24, together with crystals from the first cycle of operations.

The mother liquor drained from centrifuge 51 is withdrawn through conduit 54. It may be concentrated by evaporation, if desired, and passed to a third vacuum crystallizer (not shown) but it may also be used for fermentation purposes. If necessary, part of this mother liquor may be recycled directly to the entrance of crystallizer 34.

Figure 2:
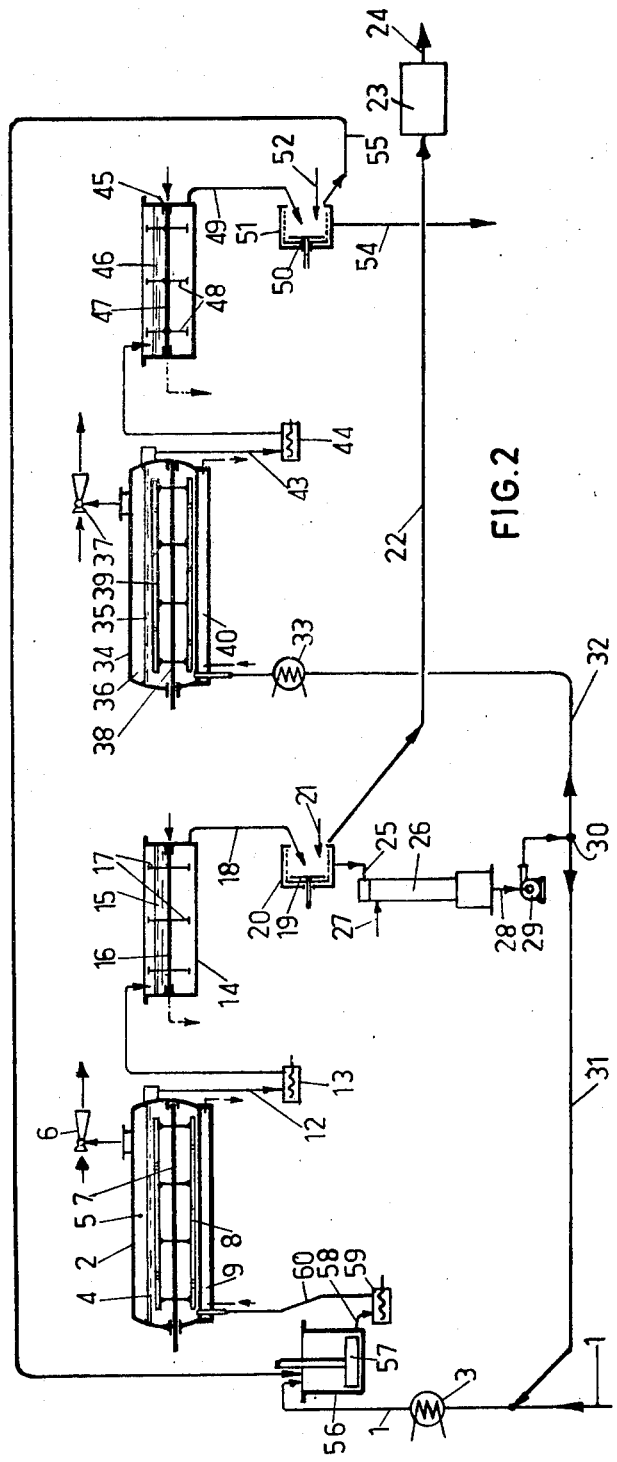
FIG. 2 shows a second embodiment of such a system.

The system of FIG. 2 roughly corresponds to that of FIG. 1. Here too, a first crystallization cycle is seen, comprising a vacuum crystallizer 2, an ageing trough 14 and a centrifuge 20. An evaporator 26 is followed by a second crystallization cycle comprising a vacuum crystallizer 34, an ageing trough 45 and a centrifuge 51. A difference with FIG. 1 is in the first place, that the washed crystals from centrifuge 51 (the second portion of crystals) are not passed to drier 23 but are passed through a conduit or conveyor 55 to a blending vessel 56 provided with stirrer 57 and blended therein with a mixture of fresh dextrose solution and concentrated mother liquor of the first cycle, coming from conduit 1. The mixture is passed then through a conduit 58, a pump 59 and a conduit 60 to vacuum crystallizer 2 and subjected therein to the aforesaid operations. In this way, the crystals from the second cycle are completely recycled and crystals are only recovered from the first crystallization cycle.

Another difference is that the vacuum crystallizer 2 in FIG. 2 is provided with a heating jacket 9 around part of its circumference (preferably not more than ⅓ of that circumference). Hot water may be supplied to this jacket and withdrawn from this jacket in the direction shown by arrows. Thanks to the supply of this hot water in jacket 9, the evaporation capacity of the crystallizer may be adjusted independent from the concentration of the incoming dextrose solution. However, the heat supply should be kept limited in such a way that no vapor bubbles are formed at the walls of heating jacket 9 or throughout the whole volume of the mass flowing through the crystallizer. In other words, the formation of vapor bubbles should be restricted to the evaporation surface of the flowing mass so that nucleation forming is prevented. In most cases, any heating with hot water in jacket 9 will be absent and in the other cases this heating is nearly absent. Crystallizer 34 in FIG. 2 also has a heating jacket 40 around part of its circumference and hot water may be added to this jacket and withdrawn from this jacket for heating purposes. In most cases, however, this heating jacket 40 need not be used and just as in crystallizer 2, the heat supply should be substantially absent, i.e. restricted in a way sufficient to prevent boiling of the flowing mass throughout its whole volume.

FIG. 3 shows a modified embodiment of the vacuum crystallizer which may be used in FIGS. 1 and 2 instead of crystallizers 2 and 34. This vacuum crystallizer 61 is also positioned horizontal, but it has been divided into two parts by a partition wall 62, thus forming a two-part elongated, horizontal, crystallization zone 63, 64 that is passed in longitudinal direction by the flowing mass. At the bottom of partition wall 62, there is a passage 65. Both parts 63 and 64 of the crystallization zone are thus continuously passed in prop flow by the flowing mass.

During operation, vapor spaces 66, 67 are formed above the flowing mass in parts 63, 64 of the crystallization zone. These vapor spaces are in connection with vacuum sources 68, 69 which create a vacuum in each space. The vacuum created in vapor space 66 is of sufficient height to bring the flowing mass in part 63 of the crystallization zone to self-evaporation at its surface and to cause a temperature drop within the mass from an initial value to an intermediate value, e.g. from 45° C. to a temperature between 40° and 34° C. Vacuum source 69 creates a higher vacuum in vapor space 67 so that the flowing mass in part 64 of the crystallization zone, which is already somewhat thickened and reduced in temperature after passing part 63, is brought again to self-evaporation at its surface and the temperature is falling further to an appropriate value for crystal growth of dextrose monohydrate, e.g. a temperature between 34° and 28° C. Thus, crystals are formed mostly at the surface of the flowing mass in part 53 and these crystals receive an opportunity to grow in the same part 63 and in part 64. Due to the higher vacuum in part 64, the level of the flowing mass is higher there than in part 63, but this will cause no problems.

Crystallizer 61 is provided with a rotor 70 which penetrates the partition wall 62 and which has axial blades 71 and 72 at its circumference. This rotor is used to effect a stirring action in planes perpendicular to the axis of the crystallization zone. In this way deeper portions of the flowing mass are constantly moved to the evaporation surface and a uniform supersaturation in each cross-sectional area of the crystallizer is created. The crystals may grow then without any nucleation formed.

Crystallizer 61 is provided with a heating jacket 73$a$, 73$b$ around part of its circumference. Hot water may be supplied to this jacket and withdrawn therefrom in the direction of the arrows. Here too, any heat supply is under the condition that no vapor bubbles are allowed to form at the walls of the heating jacket or throughout the volume of the flowing mass and in most cases the heating by means of hot water will be absent.

An advantage of vacuum crystallizer 61 is that crystal growth may be better controlled, thanks to the stepped temperature drop caused by this crystallizer. As a result thereof, the capacity of crystallizer 61 may be smaller than that of crystallizers 2 and 34.

The following examples further illustrate the process of the invention as carried out with the systems of FIGS. 1 and 2.

EXAMPLE 1

About 1550 kgs./h. of fresh dextrose solution, prepared from starch by a combined acid-enzymatic conversion treatment and having a dextrose solids content (D.S.) of 72% and a dextrose equivalent (D.E.) of 97%, are supplied through conduit 1 and mixed therein with about 720 kgs./h. of concentrated mother liquor from conduit 31, this mother liquor having a D.S. of 73–74% and a D.E. of 89%. The resulting mixture (about 2270 kgs./h. of 74% D.S. and 94.4% D.E.) is passed to cooler 3 and adjusted therein to a temperature between 45 and 50° C. Then, the mixture is passed through vacuum crystallizer 2. This crystallizer has a capacity of 32 m.$^3$, being 8 meters in length and 2.25 meters in diameter, and 24 m.$^3$ thereof is occupied by the flowing mass. Thanks to vacuum source 6, a vacuum of 19 millimeters Hg is created in vapor space 5 and the temperature of the flowing mass falls to 32° C. by means of self-evaporation, vapor bubbles only being formed at the surface of the mass. Meanwhile, the mass is stirred by means of rotors 7. The time of passing through the crystallizer is 15 hours.

A crystal-bearing slurry leaving crystallizer 2 is passed to ageing trough 14 which has a length of 6 meters, a diameter of 1.750 meters and a capacity of 14.5 m.$^3$. Part of this capacity, viz 13 m.$^3$ is occupied by slurry. The temperature of the flowing mass is kept below about 32° C. by cooling and the time of flow of the mass through the trough is 8 hours.

The product leaving trough 14 is passed to centrifuge 20 where crystals of dextrose monohydrate are separated from mother liquor. The crystals are produced in an amount of about 870 kgs./h. and passed to drier 23.

The mother liquor obtained in centrifuge 20 in an amount of about 1330 kgs./h. has a D.S. of 60% and is passed to evaporator 26, where it is concentrated to about 1140 kgs./h. having a D.S. of 73–74%. A portion of 420 kgs./h. of this concentrated mother liquor (89% D.E.) is passed via a cooler 33 to a second crystallizer 34. This crystallizer has a length of 5.5 meters, a diameter of 1.3 meters and a capacity of 7.2 m.$^3$, the greater part thereof, viz 5.4 m.$^3$, being occupied by flowing mass. A vacuum of 15 millimeters Hg is created in vapor space 36 by means of vacuum source 37 and the temperature of the flowing mass is reduced by self-evaporation (thanks to this vacuum) from a value between 45 and 50° C. to a temperature of 28° C. The time of passing through this crystallizer 34 is 18 hours under continuous stirring by means of stirring means 38.

A crystal-bearing slurry is leaving crystallizer 34 and is passed to ageing trough 45 which has a length of 3.5 meters, a diameter of 1.1 meters and a capacity of 3.3 m.$^3$, a portion of 2.5 m.$^3$ thereof being occupied by flowing slurry. The temperature of the mass or slurry is kept at about 28° C. by cooling through shaft 47 and the time of flowing through the trough is 8 hours.

The mass leaving trough 45 is passed to centrifuge 51 where it is separated into a second portion of dextrose monohydrate crystals and a second mother liquor. The resulting crystals (120 kgs./h. calculated as dry solids) are passed to drier 23. The mother liquor comprises 175 kgs./h. of dry solids and has a D.E. of 81.2%.

The crystals resulting from centrifuge 20 and centrifuge 51 are dried in drier 23 and withdrawn through conduit 24. The result is a total amount of 1000 kgs./h. of dextrose monohydrate crystals (corresponding to 910 kgs./h. of dry solids). This means a yield of 84%, based on the solids content of the supplied fresh dextrose solution.

EXAMPLE 2

About 1520 kgs./h. of fresh dextrose solution, having a D.S. of 70% and a D.E. of 97%, is supplied to conduit 1 of FIG. 2, wherein it is blended with about 870 kgs./h. of concentrated mother liquor having a D.S. of 71% and a D.E. of 89%. The resulting mixture (about 2390 kgs./h. having a D.S. of slightly more than 70% and D.E. of 94.1%) is passed to cooler 3 and is cooled therein to a temperature of 45–50° C. In blender 56, the mixture is mixed with wet dextrose monohydrate crystals from conduit 55 (about 175 kgs./h. corresponding to about 165 kgs./h. of pure monohydrate). Then, the whole mixture is passed to vacuum crystallizer 2. This crystallizer has a length of 8 meters, a diameter of 2.40 meters and a capacity of 36.5 m.$^3$, a portion of 27.5 m.$^3$ thereof being occupied by flowing mass. A limited heat supply from the outside is provided by jacket 9. A vacuum of 19 millimeters Hg is created in vapor space 5 by means of vacuum source 6 and the temperature of the flowing mass within the vacuum crystallizer falls by self-evaporation to a value of about 32° C. Meanwhile, the mass is stirred by means of rotors 7. The time of flowing through crystallizer 2 is 15 hours and the result is a crystal-bearing slurry.

The crystal-bearing slurry leaving the crystallizer is passed to ageing trough 14 which has a capacity of 16.5 m.$^3$, a portion of 15 m.$^3$ thereof being occupied by flowing slurry. The temperature is kept at a value of 32° C. by cooling and the time of flowing through the trough is 8 hours. The mixture leaving the trough is passed to centrifuge 20 and is separated therein into crystals and mother liquor. Resulting from centrifuge 20 is about 910 kgs./h. of dextrose monohydrate crystals which are passed to drier 23.

The mother liquor leaving centrifuge 20 in an amount of about 1520 kgs./h. has a D.S. of 60% and is passed to evaporator 26 where it is concentrated to an amount of about 1300 kgs./h. having a D.S. of 71% and a D.E. of 89%. A portion of about 870 kgs./h. of this concentrated mother liquor is recycled to supply conduit 1 and another portion of about 430 kgs./h. is passed through cooler 33 to a second crystallizer 34. This crystallizer 34 has a capacity of 7.6 m.³, a portion of 5.7 m.³ thereof being occupied by flowing mass. A vacuum of 15 millimeters Hg is created in the vapor space of the crystallizer by means of vacuum source 37, and the temperature of the flowing mass in the crystallizer is reduced by self-evaporation at its surface from a value between 45 and 50° to a value of 28° C. The time of flowing through the crystallizer is 18 hours and meanwhile, the mass is constantly stirred by stirring means 38. A limited supply of extraneous heat is provided by jacket 40. This results in a crystal-bearing slurry.

The resulting crystal-bearing slurry which leaves crystallizer 34 is passed to ageing trough 45 which has a capacity of 2.8 m.³ and is charged with flowing mass to a volume of 2.5 m.³. The temperature of the flowing mass is kept at a value of about 28° C. by cooling and the time of flowing through the trough is about 8 hours.

The whole mixture leaving trough 45 is passed to centrifuge 51 and separated therein into dextrose monohydrate crystals and a mother liquor.

The result is about 175 kgs./h. of wet dextrose monohydrate crystals (about 165 kgs./h. of pure hydrate or about 120 kgs./h. of dry solids) which are passed to blender 56. Further, a mother liquor comprising about 150 kgs./h. of dextrose solids and having a D.E. of 78.8% is obtained.

An amount of about 1000 kgs./h. of dextrose monohydrate (corresponding to about 910 kgs./h. of dry solids) is obtained at 24. Thus, the yield is 86% based on the solids content of the freshly supplied dextrose solution.

What I claim is:

1. The process of continuously producing crystalline dextrose monohydrate, which comprises the steps of:
   (a) continuously forming a concentrated dextrose solution having a temperature of about 45–50° C.;
   (b) continuously introducing the solution of step (a) into one end of a horizontally elongate zone continuously to displace a like volume of slurry which is dextrose monohydrate - supersaturated mother liquor and crystalline dextrose monohydrate from the opposite end of said zone;
   (c) maintaining a free surface of material within said zone;
   (d) maintaining a vacuum at said surface sufficient to cause evaporation only at said free surface and cooling of the material to form crystals of dextrose monohydrate at said free surface;
   (e) stirring the material in said zone continuously (1) to bring new material to said free surface only in planes substantially perpendicular to material flow so as to avoid propulsion of the material toward either end of said zone and (2) to produce supersaturation of said material with dextrose monohydrate which is uniform throughout any cross-sectional area of said zone whereby to allow the crystals formed in step (d) to grow without nucleation;
   (f) continuously introducing the slurry from the first zone into one end of a horizontally elongate second zone continuously to displace a like volume of material which is dextrose monohydrate-saturated mother liquor and crystalline dextrose monohydrate from the opposite end of the second zone;
   (g) stirring the material in said second zone continuously only in planes perpendicular to the direction of material flow through said second zone so as (1) to avoid propulsion of the material toward either end of the second zone and (2) to provide substantially uniform supersaturation throughout any cross-sectional area of said second zone;
   (h) maintaining substantially constant temperature and atmospheric pressure conditions in said second zone progressively to decrease the supersaturation in said second zone from said one end to the opposite end thereof whereby to obtain the slurry of step (f);
   (i) continuously separating the crystalline dextrose monohydrate and the saturated mother liquor from the slurry contained in step (f);
   (j) continuously concentrating mother liquor from step (i) by evaporating; and
   (k) forming the solution of step (a) at least in part by the concentrated mother liquor of step (j).

2. The process as claimed in claim 1, wherein the vacuum in said first zone is adjusted to cause a temperature fall within the flowing mass from an initial temperature of 45° C. to a temperature between 34° and 28° C. when the flowing mass has an initial dextrose concentration of 70 to 72%.

3. The process as claimed in claim 1, wherein said first zone comprises at least two parts situated one behind the other in longitudinal direction of said zone and wherein vacuums of different height are created in the parts of said crystallization zone, the vacuum in a part of said zone later to be passed by said dextrose mass being higher than the vacuum in a part of said zone earlier to be passed by said mass.

4. The process as claimed in claim 3, wherein the vacuum in a first part of said first zone is adjusted to a height sufficient for causing a temperature fall within the flowing dextrose mass from an initial temperature of about 45° C. to a temperature between 40° and 34° C., when the dextrose mass has an initial dextrose concentration of 70 to 72%, and wherein the vacuum in a second part of said crystallization zone is adjusted to a height sufficient to cause a temperature fall within the flowing mass from a temperature between 40° and 34° C. to a temperature between 34° and 28° C.

5. The process as claimed in claim 1, including the step of cooling the material in said second zone.

6. The process as defined in claim 1 which includes the further steps of:
   (a) continuously introducing a portion of said concentrated mother liquor into a horizontally elongate third zone at one end thereof continuously to displace a like volume of slurry which is dextrose monohydrate-supersaturated mother liquor and crystalline dextrose monohydrate from the opposite end of said third zone;
   (b) maintaining a free surface of material within said third zone;
   (c) maintaining a vacuum at said surface of the third zone sufficient to cause evaporation only at such free surface and cooling of the material to form crystals of dextrose monohydrate at such free surface;
   (d) stirring the material in said third zone continuously (1) to bring new material to the free surface of the third zone only in planes substantially perpendicular to material flow so as to avoid propulsion of material toward either end of the third zone and (2) to produce supersaturation of the material with dextrose monohydrate which is uniform throughout any cross-sectional area of said third zone whereby to allow crystals of dextrose monohydrate to grow without nucleation;
   (e) continuously introducing slurry from said third zone into one end of a horizontally elongate fourth zone continuously to displace a like volume of material which is dextrose monohydrate-saturated mother liquor and crystalline dextrose monohydrate from the opposite end of said fourth zone;
   (f) stirring the material in said fourth zone continuously only in planes perpendicular to the direction of material flow through said fourth zone so as (1) to avoid propulsion of the material toward either end of said fourth zone and (2) to provide substantially uniform supersaturation throughout any cross-sectional area of said fourth zone;

(g) maintaining substantially constant temperature and atmospheric pressure conditions in said fourth zone progressively to decrease the supersaturation in said fourth zone from said one end to said opposite end thereof; and (h) continuously separating the crystalline dextrose monohydrate and saturated mother liquor from the slurry of step (e).

7. The process as claimed in claim 6, wherein said second portion of crystals is combined with said first portion of crystals.

8. The process as claimed in claim 6, wherein the second portion of crystals is blended with a concentrated dextrose solution and thereafter recycled to the aforesaid first crystallization zone.

References Cited

UNITED STATES PATENTS

| | | | |
|---|---|---|---|
| 3,257,665 | 6/1966 | Idaszak | 127—58 |
| 2,587,293 | 2/1952 | De Vries | 127—60 |

JOSEPH SCOVRONEK, Primary Examiner

U.S. Cl. X.R.

127—16, 60, 61, 62